(12) United States Patent
Nowatari (10) Patent No.: US 10,486,237 B2
(45) Date of Patent: Nov. 26, 2019

(54) PRODUCTION METHOD AND PRODUCTION APPARATUS FOR RING-SHAPED PART

(71) Applicant: Shuichi Nowatari, Kanagawa (JP)

(72) Inventor: Shuichi Nowatari, Kanagawa (JP)

( * ) Notice: Subject to any disclaimer, the term of this patent is extended or adjusted under 35 U.S.C. 154(b) by 0 days.

(21) Appl. No.: 16/315,621

(22) PCT Filed: May 24, 2017

(86) PCT No.: PCT/JP2017/019406
§ 371 (c)(1),
(2) Date: Jan. 4, 2019

(87) PCT Pub. No.: WO2018/008279
PCT Pub. Date: Jan. 11, 2018

(65) Prior Publication Data
US 2019/0184466 A1 Jun. 20, 2019

(30) Foreign Application Priority Data

Jul. 7, 2016 (JP) .................................. 2016-135418

(51) Int. Cl.
*B23B 5/36* (2006.01)
*B23B 27/00* (2006.01)
(Continued)

(52) U.S. Cl.
CPC ............ *B23B 5/365* (2013.01); *B23B 27/007* (2013.01); *B23B 27/02* (2013.01); *B23B 27/04* (2013.01);
(Continued)

(58) Field of Classification Search
CPC ....... B23B 5/365; B23B 27/007; B23B 27/02; B23B 27/04; B23B 2226/61; F16J 15/02
See application file for complete search history.

(56) References Cited

U.S. PATENT DOCUMENTS 1,676,937 A * 7/1928 Vidarshof ............. B23B 27/007
407/84
1,815,756 A * 7/1931 Aulenback ............ B23B 27/007
407/80
(Continued)

FOREIGN PATENT DOCUMENTS

JP H10-323845 A 12/1998
JP H11-201289 A 7/1999

OTHER PUBLICATIONS

The International Search Report and Written Opinion for PCT/JP2017/019406 dated Aug. 22, 2017.

*Primary Examiner* — Willmon Fridie, Jr.
(74) *Attorney, Agent, or Firm* — Kenealy Vaidya LLP (57) ABSTRACT

A production method for a ring-shaped part is provided with: an inner cutting step for reciprocating a first cutting blade in the radial direction D4 from a state of contact with the center of the thickness of one end 91a of a rotating cylindrical blank 91 and moving toward the other end 91b in the axial direction D1 to form a semicircular track while cutting the inner circumferential R1-side of the cylindrical blank 91; an outer cutting step before, after or simultaneously with the inner cutting step for reciprocating a second cutting blade in the radial direction D4 from a state of contact with the center of the thickness of the one end 91a of the rotating cylindrical blank 91 and moving toward the other end 91b in the axial direction D1 to form a semicircular track while cutting the outer circumferential R2-side of the cylindrical blank 91; and a separation step after the inner cutting step and the outer cutting step for cutting the portion 92 of the cylindrical blank 91, the inner circumferential R1-side and the outer circumferential R2-side of which have been cut, from the remainder 93 of the cylindrical blank 91 to obtain a ring-shaped part 94 with a roughly circular cross-section.

5 Claims, 7 Drawing Sheets (51) Int. Cl.
*B23B 27/02* (2006.01)
*B23B 27/04* (2006.01)
*F16J 15/10* (2006.01)
*F16J 15/3284* (2016.01)

(52) U.S. Cl.
CPC ......... *B23B 2226/61* (2013.01); *F16J 15/102* (2013.01); *F16J 15/3284* (2013.01)

(56) References Cited

U.S. PATENT DOCUMENTS

| | | | | |
|---|---|---|---|---|
| 2,192,267 | A * | 3/1940 | Kelley | B23Q 35/103 |
| | | | | 82/19 |
| 2,328,359 | A * | 8/1943 | Ramsdell | B23B 27/007 |
| | | | | 407/97 |
| 2,788,566 | A * | 4/1957 | Purser | B23B 27/007 |
| | | | | 407/64 |
| 5,566,597 | A * | 10/1996 | Fazis | B23B 5/365 |
| | | | | 82/1.11 |
| 2006/0024130 | A1* | 2/2006 | Loustanau | B23B 1/00 |
| | | | | 403/383 |
| 2006/0196324 | A1* | 9/2006 | Hayashi | B23B 5/36 |
| | | | | 82/114 |
| 2008/0245227 | A1* | 10/2008 | Iizumi | B23B 27/007 |
| | | | | 92/169.1 |
| 2016/0250690 | A1* | 9/2016 | Mandler | B23B 3/32 |
| | | | | 82/1.11 |
| 2018/0111202 | A1* | 4/2018 | Ishihara | B23B 1/00 |

* cited by examiner

PRODUCTION METHOD AND PRODUCTION APPARATUS FOR RING-SHAPED PART

This application is a U.S. national phase filing under 35 U.S.C. § 371 of PCT Application No. PCT/JP2017/019406, filed May. 24, 2017, and claims priority under 35 U.S.C. § 119 to Japanese patent application number JP2016-135418 filed on Jul. 7, 2016, the entireties of which are incorporated herein by reference.

TECHNICAL FIELD

The present invention relates to a production method and production apparatus for a ring-shaped part.

BACKGROUND ART

O-rings are widely used for sealing (seals). O-rings are produced from a material having resilience in order to seal by the pressure generated when crushed. A common material as the material of O-rings is rubber. Patent Document 1 listed below discloses a method of producing O-rings from silicone rubber.

The production method disclosed in Patent Document 1 is a method of producing O-rings by press molding using dies. In press molding, the silicone rubber in the die cavity swells upon press molding and a valley tends to be produced, due to being conducted by heating the dies.

As a countermeasure thereof, the excess silicone rubber other than the volume amount of the O-ring that is the product or the silicone rubber swelled by heat is suctioned by a valley suction part, and subsequently, the valley suction part is cut off. However, it is difficult to cut off to cleanly leave only the product portion, and defects tend to occur. Therefore, with the technology of Patent Document 1, press molding is performed by sandwiching a film having a thickness on the order of 25 μm between the pressing die and fixed side die having a die cavity of the O-ring.

Patent Document 1: Japanese Unexamined Patent Application, Publication No. H10-323845

DISCLOSURE OF THE INVENTION

Problems to be Solved by the Invention

However, in the case of producing an O-ring by press molding, dies are required, and thus a manufacturing period for the dies themselves is also necessary. In addition, since different dies are required for every shape of O-ring, it is not suited to small-volume production in great varieties.

Therefore, the present invention has an object of providing a production method and production apparatus for ring-shaped parts which can provide ring-shaped parts in a short time, as well as being suited to small-volume production in great varieties.

Means for Solving the Problems

A production method for a ring-shaped part of the present invention relates to a production method for a ring-shaped part including: a rotating step of rotating a cylindrical material made of resin around an axial direction thereof; an inner cutting step of cutting an inner circumferential side of the cylindrical material while forming a semicircular track, by causing a first cutting blade to reciprocate in a radial direction of the cylindrical material from a state contacting a thickness center of one end of the cylindrical material which is rotating in the rotating step, and causing to move relatively to a side of an other end of the cylindrical material in an axial direction; an outer cutting step of, before, after or simultaneously with the inner cutting step, cutting an outer circumferential side of the cylindrical material while forming a semicircular track, by causing the second cutting blade to reciprocate in the radial direction of the cylindrical material from a state contacting the thickness center of the one end of the cylindrical material which is rotating, and causing to move relatively to a side of the other end of the cylindrical material in the axial direction; and a separation step of, after the inner cutting step and outer cutting step, causing a portion of the cylindrical material which has had the inner circumferential side and the outer circumferential side cut to separate from a remainder of the cylindrical material by severing, and obtaining a ring-shaped part having a substantially circular cross-section.

In addition, the separation step may contact the third cutting blade to the other end of the portion of the cylindrical material which is rotating and has had the inner circumferential side and the outer circumferential side cut, and cause the portion of the cylindrical material to separate from the remainder of the cylindrical material by severing.

Furthermore, in the inner cutting step, the outer cutting step and the separation step, machining may be performed on the cylindrical material using a machining device having a cutter moving mechanism which simultaneously holds the first cutting blade, the second cutting blade and the third cutting blade, and moves in an axial direction and a transverse direction perpendicular to the axial direction.

Furthermore, the resin may be a fluororesin.

Moreover, a production apparatus for a ring-shaped part of the present invention relates to a production apparatus for a ring-shaped part including: a material rotating mechanism which causes a cylindrical material made of resin to rotate around an axial direction thereof; a first cutting blade moving mechanism which causes a first cutting blade to move, and cuts an inner circumferential side of the cylindrical material while forming a semicircular track, by causing the first cutting blade to reciprocate in a radial direction of the cylindrical material from a state contacting a thickness center of one end of the cylindrical material which is rotating by way of the material rotating mechanism, and causing to move to a side of an other end of the cylindrical material in an axial direction; a second cutting blade moving mechanism which causes a second cutting blade to move, and cuts an outer circumferential side of the cylindrical material while forming a semicircular track, by causing the second cutting blade to reciprocate in a radial direction of the cylindrical material from a state contacting the thickness center of the one end of the cylindrical material which is rotating, and causing to move to a side of the other end of the cylindrical material in the axial direction; and a third cutting blade moving mechanism which causes a third cutting blade to move, and contacts the third cutting blade to a side of the other end of a portion of the cylindrical material which has had an inner circumferential side and an outer circumferential side cut and is rotating, and separates portion of the cylindrical material from a remainder of the cylindrical material by severing to obtain a ring-shaped part having a substantially circular cross-section.

Effects of the Invention

According to the present invention, it is possible to provide a production method and production apparatus for ring-shaped parts which can provide ring-shaped parts in a short time, as well as being suited to small-volume production in great varieties.

PREFERRED MODE FOR CARRYING OUT THE INVENTION

Figure 1:
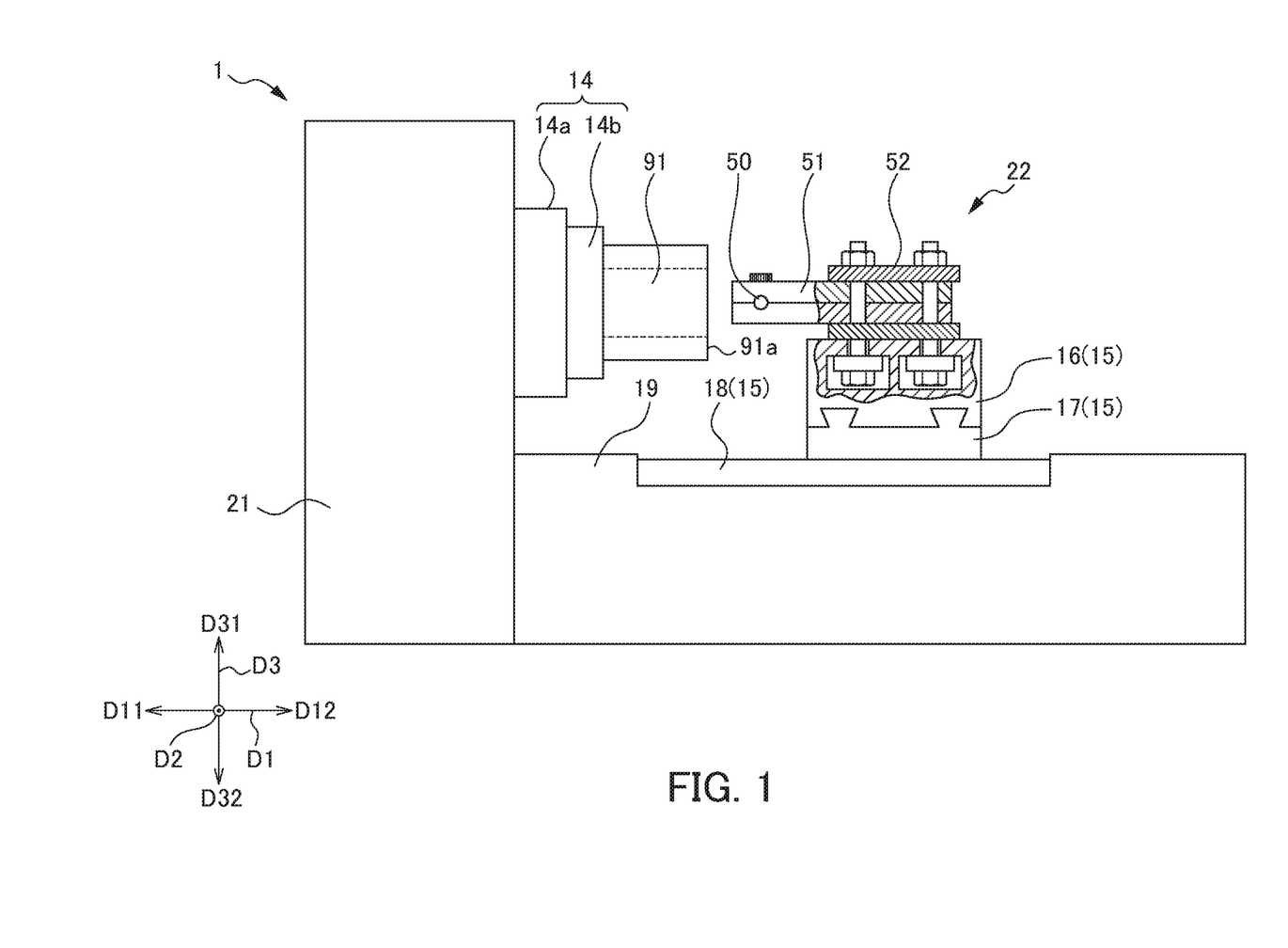
FIG. 1 is a front view showing a production apparatus for ring-shaped parts of an embodiment of the present invention.
Figure 2:
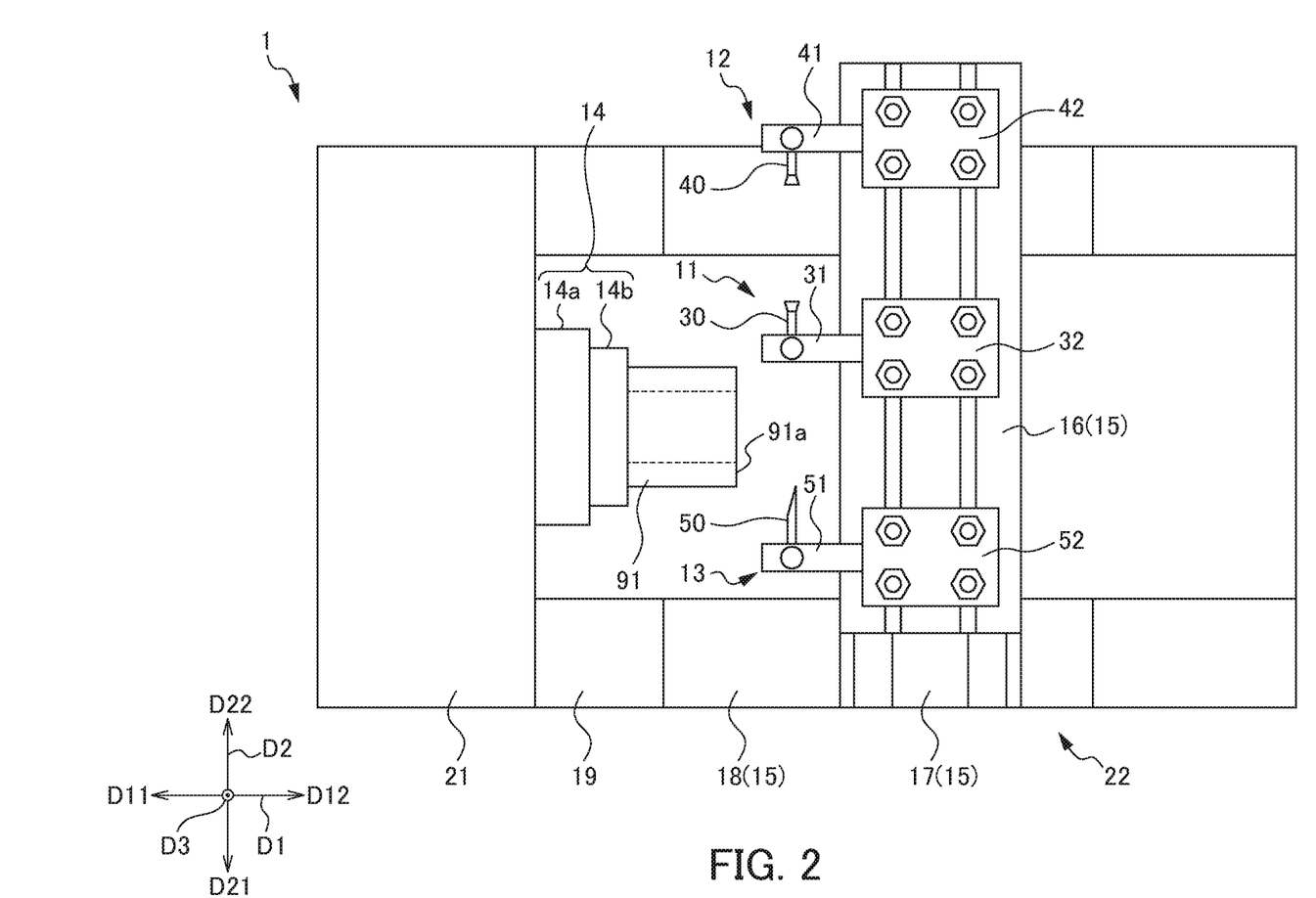
FIG. 2 is a plan view of the production apparatus.
Figure 3A:
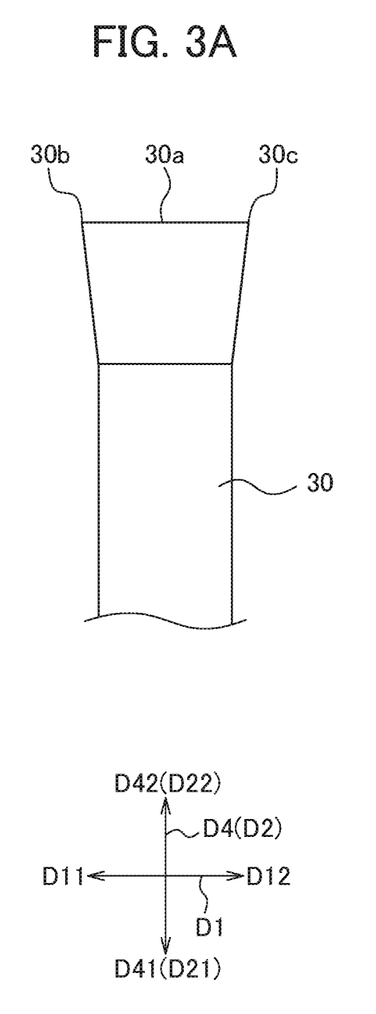
FIG. 3A is a view showing a first cutting blade of the production apparatus.
Figure 3B:
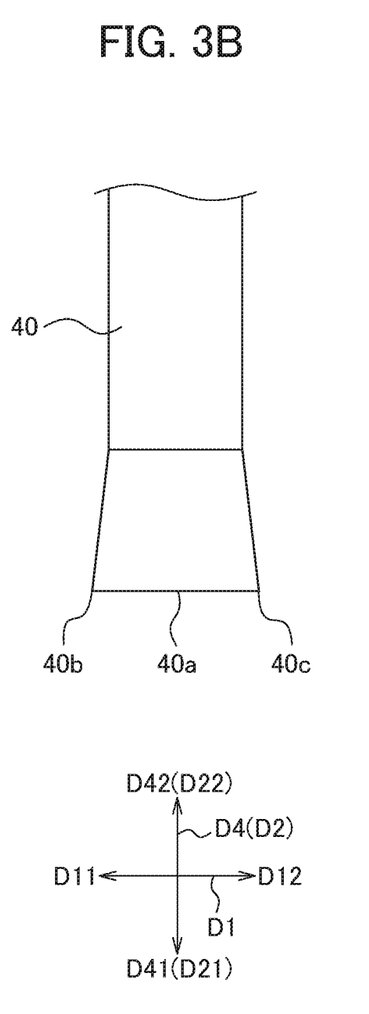
FIG. 3B is a view showing a second cutting blade of the production apparatus.
Figure 4A:
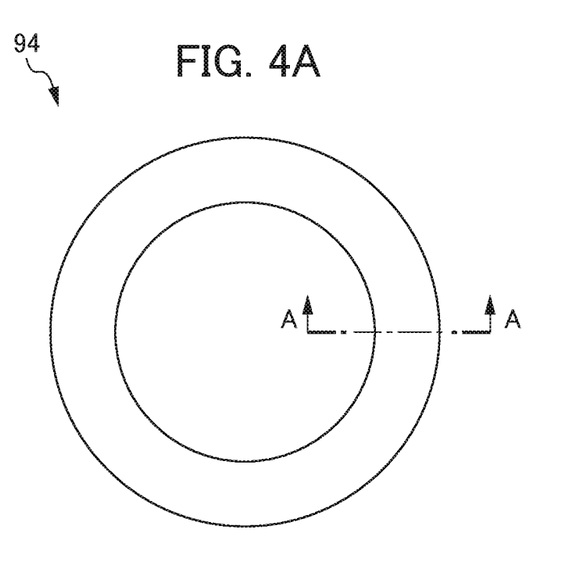
FIG. 4A is a general view showing an example of an O-ring produced by the present invention.
Figure 4B:
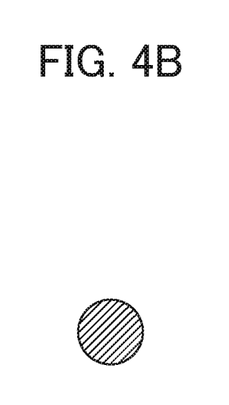
FIG. 4B is a cross-sectional view along the line A-A shown in FIG. 3A, showing an example of an O-ring produced by the present invention.
Figure 5A:
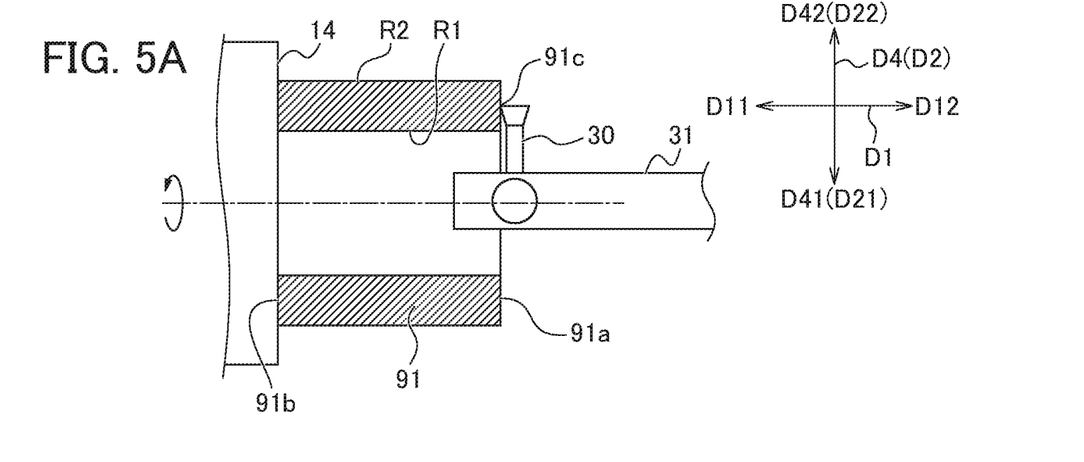
FIG. 5A is a view showing an inner circumference cutting step of a ring-shaped part in the production method for a ring-shaped part of an embodiment of the present invention.
Figure 5B:
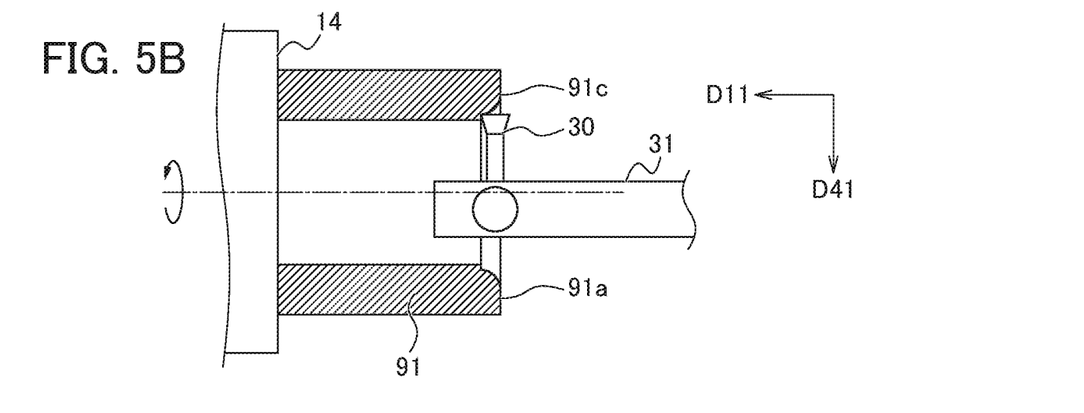
FIG. 5B is a view showing an inner circumference cutting step of a ring-shaped part in the production method for a ring-shaped part of an embodiment of the present invention.
Figure 5C:
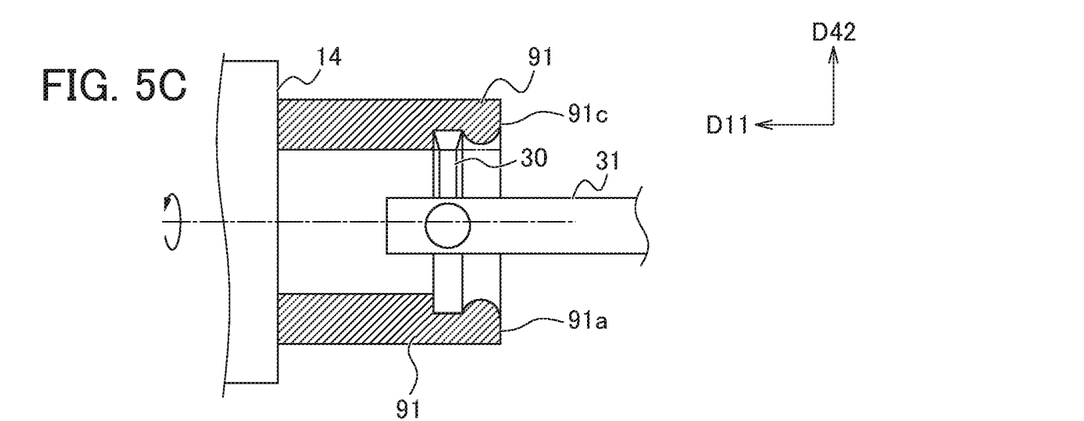
FIG. 5C is a view showing an inner circumference cutting step of a ring-shaped part in the production method for a ring-shaped part of an embodiment of the present invention.
Figure 6A:
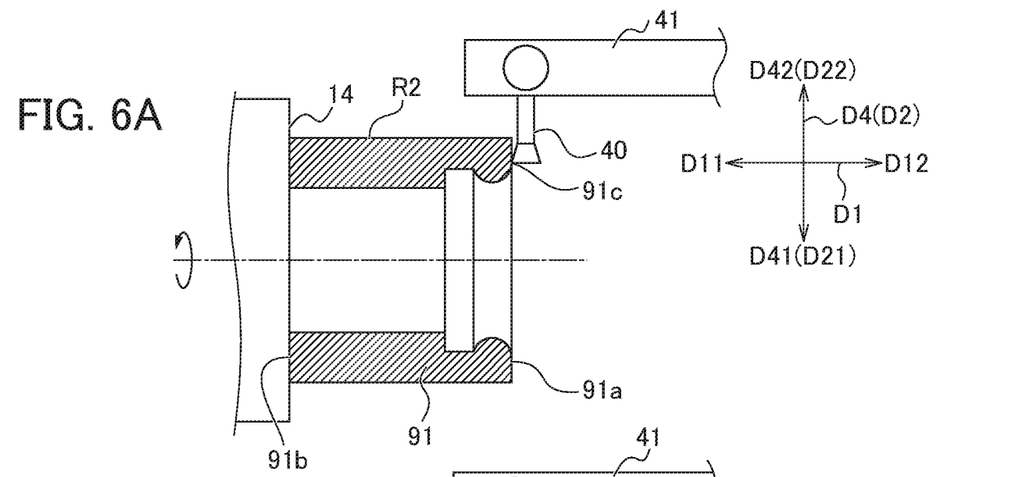
FIG. 6A is a view showing an outer circumference cutting step of a ring-shaped part in the production method for a ring-shaped part of an embodiment of the present invention.
Figure 6B:
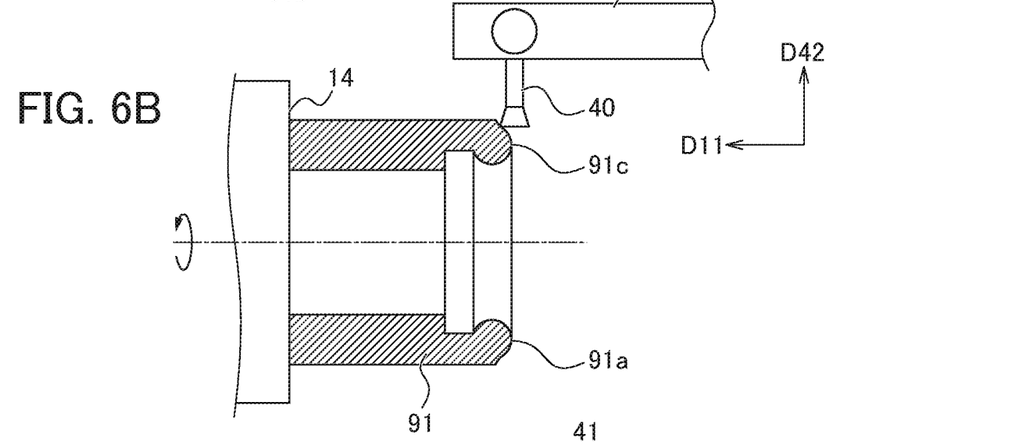
FIG. 6B is a view showing an outer circumference cutting step of a ring-shaped part in the production method for a ring-shaped part of an embodiment of the present invention.
Figure 6C:
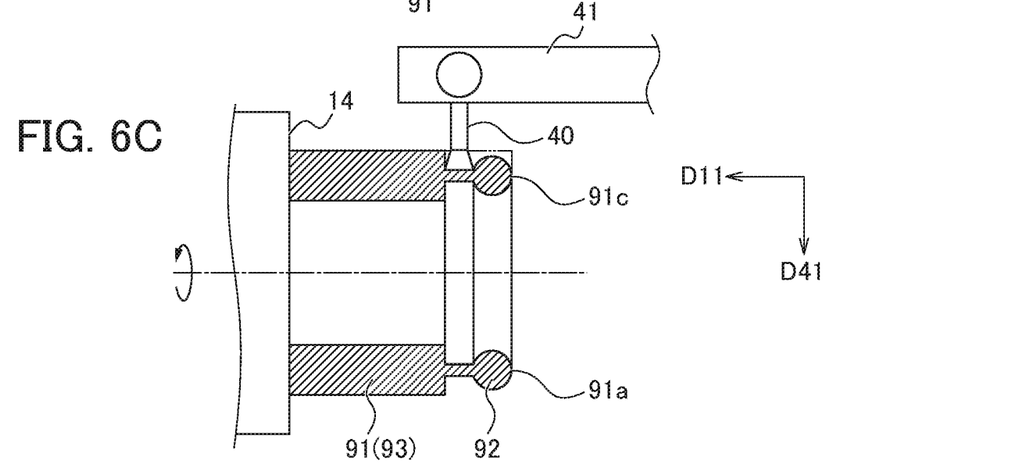
FIG. 6C is a view showing an outer circumference cutting step of a ring-shaped part in the production method for a ring-shaped part of an embodiment of the present invention.
Figure 7A:
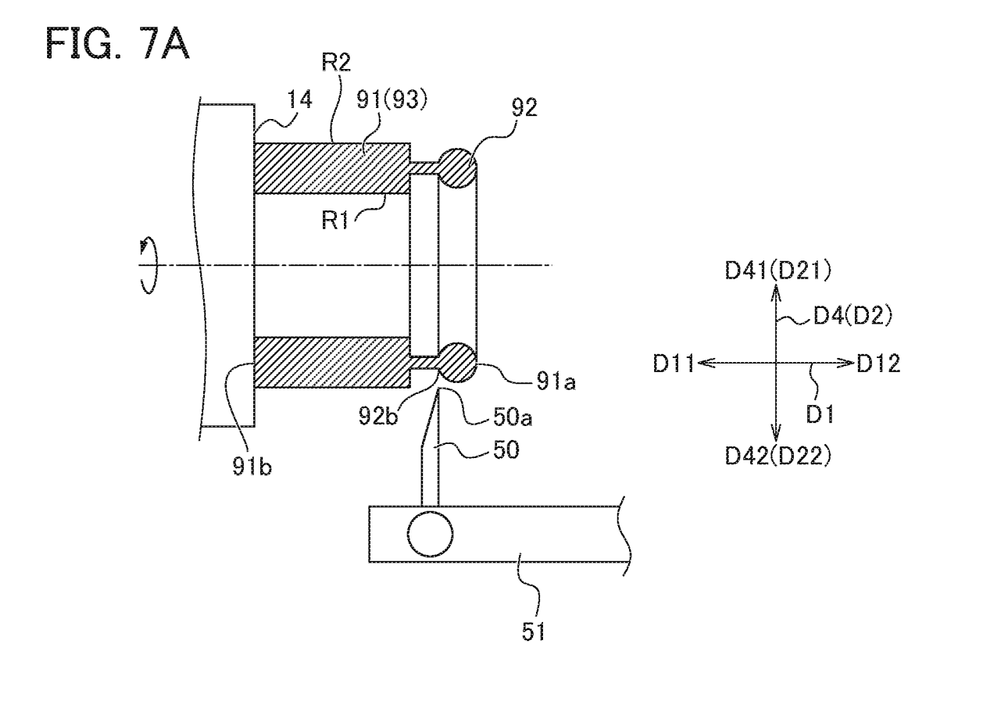
FIG. 7A is a view showing a separation step of a ring-shaped part in the production method for a ring-shaped part of an embodiment of the present invention.
Figure 7B:
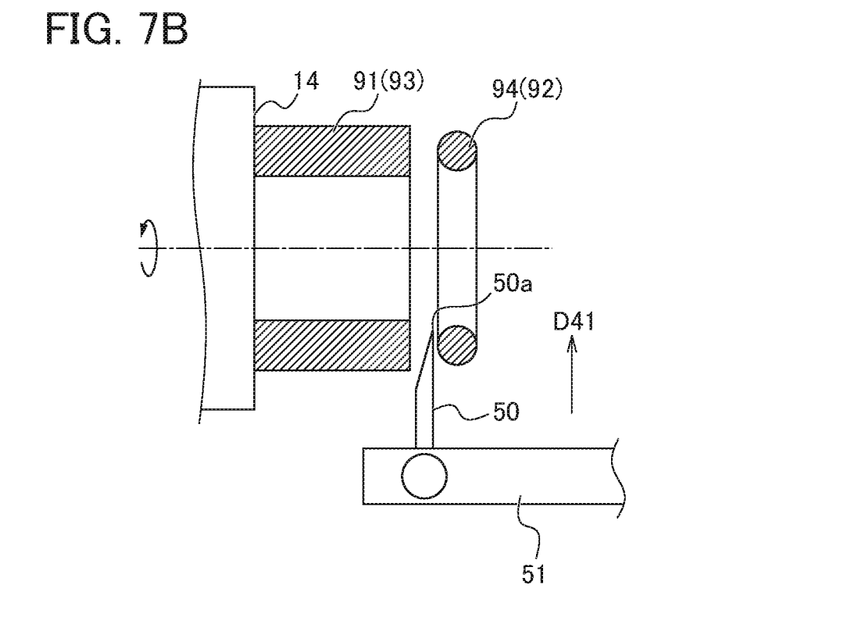
FIG. 7B is a view showing a separation step of a ring-shaped part in the production method for a ring-shaped part of an embodiment of the present invention.

Hereinafter, a production apparatus 1 for ring-shaped parts according to an embodiment of the present invention will be explained by referencing the drawings. The production method for the ring-shaped part according to the embodiment of the present invention is realized by this production apparatus. FIG. 1 is a front view showing a production apparatus for a ring-shaped part according to an embodiment of the present invention. FIG. 2 is a plan view of the production apparatus. FIG. 3A is a view showing a first cutting blade of the production apparatus. FIG. 3B is a view showing a second cutting blade of the production apparatus. FIG. 4A is a general view showing an example of an O-ring produced by the present invention. FIG. 4B is a cross-sectional view along the line A-A shown in FIG. 4A. FIGS. 5A to 5C are views showing an inner circumference cutting step of a ring-shaped part in the production method for ring-shaped parts according to an embodiment of the present invention. FIGS. 6A to 6C are views showing an outer circumference cutting step of a ring-shaped part in the production method for ring-shaped parts according to an embodiment of the present invention. FIGS. 7A and 7B are views showing a separation step of a ring-shaped part in the production method for ring-shaped parts according to an embodiment of the present invention.

In each drawing, the direction in which the central axis of the rotation shaft 14a of the production apparatus 1 extends is referred to as a spindle direction D1, a direction orthogonal to the spindle direction D1 on a horizontal plane is referred to as a depth direction D2, and a direction orthogonal to the spindle direction D1 and depth direction D2 is referred to as a vertical direction D3. The axial direction of a cylindrical material 91 made of resin matches the spindle direction D1, and is also referred to as axial direction D1. In addition, regarding the spindle direction D1, a direction approaching a chuck 14b of the production apparatus 1 is referred to as a first spindle direction D11, and a direction opposite the first spindle direction D11 is referred to as a second spindle direction D12. The spindle direction D1 matches the axial direction of the cylindrical material 91 retained to a material rotating mechanism 14 (rotating shaft 14a, chuck 14b). For this reason, the axial direction of the cylindrical material 91 is referred to as the axial direction D1. Regarding the depth direction D2, a direction towards a near side is referred to as a first depth direction D21, and a direction opposite the first depth direction D21 is referred to as a second depth direction D22. In addition, regarding the vertical direction D3, the direction towards up is referred to as up direction D31, and the direction opposite the up direction D31 is referred to as down direction D32. In the radial direction D4 of the cylindrical material 91, a direction towards the center is referred to as an inward radial direction D41, and the direction opposite the inward radial direction D41 is referred to as an outward radial direction D42. In the present embodiment, a direction extending along a horizontal plane in the radial direction D4 matches the depth direction D2.

(Overall Configuration of Production Apparatus for Ring-Shaped Parts)

The production apparatus 1 for ring-shaped parts is an apparatus which produces a ring-shaped part 94 made of resin having a substantially circular cross-section from the cylindrical material 91 made of resin, as shown in FIGS. 4A to 7B. The resin of the present embodiment is a fluororesin. As the fluororesin, PTFE, PFA and FEP can be exemplified. The substantially circular cross-section is not limited to a perfect circle shape, and may be a shape perceived as circular. For example, an elliptical shape can be exemplified. It should be noted that the resin may be a resin other than a fluororesin. The ring-shaped part 94 of the present embodiment is an O-ring. It should be noted that the ring-shaped part may be a part other than an O-ring.

As shown in FIGS. 1 to 3B, the production apparatus 1 for ring-shaped parts includes: the material rotating mechanism 14 (rotating shaft 14a, chuck 14b) causes the cylindrical material 91 made of resin to rotate around the axial direction D1 thereof; a first cutting blade moving mechanism 11 that causes a first cutting blade 30 to move (first cutting blade holder 31, first tool post 32, depth-direction moving part 16, spindle-direction upper moving part 17, spindle-direction lower moving part 18); a second cutting blade moving mechanism 12 that causes a second cutting blade 40 to move (second cutting blade holder 41, second tool post 42, depth-direction moving part 16, spindle-direction upper moving part 17, spindle-direction lower moving part 18); and a third cutting blade moving mechanism 13 that causes a third cutting blade 50 to move (third cutting blade holder 51, third tool post 52, depth-direction moving part 16, spindle-direction upper moving part 17, spindle-direction lower moving part 18).

The first cutting blade moving mechanism 11 (first cutting blade holder 31, first tool post 32, depth-direction moving part 16, spindle-direction upper moving part 17, spindle-direction lower moving part 18) includes a first cutting blade holding part (first cutting blade holder 31, first tool post 32) and a cutter moving mechanism 15 (depth-direction moving part 16, spindle-direction upper moving part 17, spindle-direction lower moving part 18). The first cutting blade moving mechanism 11 cuts a side on the inner circumference R1 of the cylindrical material 91, while forming a semicircular track, by reciprocating the first cutting blade 30 in the radial direction D4 of the cylindrical material 91, from a state contacting a thickness center 91c of an end 91a of the cylindrical material 91 which is rotating by way of the material rotating mechanism 14, as well as causing to move to the side of the other end 91b of the cylindrical material 91 in the spindle direction D1 (first spindle direction D11).

The second cutting blade moving mechanism 12 (second cutting blade holder 41, second tool post 42, depth-direction moving part 16, spindle-direction upper moving part 17, spindle-direction lower moving part 18) includes a second cutting blade holding part (second cutting blade holder 41, second tool post 42) and a cutter moving mechanism 15 (depth-direction moving part 16, spindle-direction upper moving part 17, spindle-direction lower moving part 18). The second cutting blade moving mechanism 12 cuts the side of the outer circumference R2 of the cylindrical material 91, while forming the semicircular track, by reciprocating the second cutting blade 40 in the radial direction D4 of the cylindrical material 91, from a state contacting a thickness center 91c of the end 91a of the cylindrical material 91 which is rotating, as well as causing to move to the side of the other end 91b of the cylindrical material 91 in the spindle direction D1 (first spindle direction D11).

The third cutting blade moving mechanism 13 (third cutting blade holder 51, third tool post 52, depth-direction moving part 16, spindle-direction upper moving part 17, spindle-direction lower moving part 18) includes a third cutting blade holding part (third cutting blade holder 51, third tool post 52) and a cutter moving mechanism 15 (depth-direction moving part 16, spindle-direction upper moving part 17, spindle-direction lower moving part 18). The third cutting blade moving mechanism 13 contacts the third cutting blade 50 to the side of the other end 91b of the portion 92 of the cylindrical material 91 which has had the side of the inner circumference R1 and the side of the outer circumference R2 (this contacting position is also referred to as other end 92b), and causes the portion 92 of the cylindrical material 91 to separate from the remainder 93 of the cylindrical material 91 by severing.

(Material Rotating Mechanism 14)

The material rotating mechanism 14 is installed to a rotary drive unit 21 of the production apparatus 1 for ring-shaped parts, and includes the rotating shaft 14a and chuck 14b. The rotating shaft 14a causes the cylindrical material 91 to rotate at an arbitrary rotation number which is a fixed rotation number around the central axis thereof. The rotating shaft 14a is driven by a motor (not shown) in the rotary drive unit 21, and startup, stop and control of the rotation number are performed by a control device (not shown) in the rotary drive unit 21. The chuck 14b is provided at a leading end of the rotating shaft 14a, and retains the cylindrical material 91. The chuck 14b retains the side of the outer circumference R2 of the cylindrical material 91 by way of a plurality of claws (not shown) installed radially, so that the rotation center of the cylindrical material 91 and the spindle direction D1 thereof match, so that the cylindrical material 91 does not move or whirl, by the cutting force from the first cutting blade 30, second cutting blade 40 or third cutting blade 50.

(Cutter Moving Mechanism 15)

The cutter moving mechanism 15 includes the depth direction moving part 16, spindle direction upper moving part 17, and spindle direction lower moving part 18, 18. The cutter moving mechanism 15 is shared by the first cutting blade moving mechanism 11, second cutting blade moving mechanism 12 and third cutting blade moving mechanism 13. The spindle-direction lower moving parts 18, 18 are provided as a pair separated in the depth direction D2, and reciprocate above bases 19, 19 of the production apparatus 1 in the spindle direction D1 (first spindle direction D11, second spindle direction D12) by the driving mechanism of the rotary drive unit 21. The bases 19, 19 extend, on both sides in the depth direction D2 sandwiching the rotating shaft 14a, in the second spindle direction D12, in parallel to the spindle direction D1 from the rotary drive unit 21.

The spindle-direction upper moving part 17 is supported by being hung on the spindle-direction lower moving parts 18, 18 which are separated in the depth direction D2, and fixed thereto, and for this reason, moves in the spindle direction D1 together with the movement in the spindle direction D1 of the spindle-direction lower moving parts 18,18.

The spindle-direction upper moving part 17 causes the first cutting blade 30 to move to the thickness center 91c of the end 91a of the cylindrical material 91 which is rotating by way of the material rotating mechanism 14, and subsequently causes to move in the first spindle direction D11 to the side of the other end 91b of the cylindrical material 91. The spindle-direction upper moving part 17 causes the second cutting blade 40 to move to the thickness center 91c of the end 91a of the cylindrical material 91 which is rotating, and subsequently causes to move in the first spindle direction D11 to the side of the other end 91b of the cylindrical material 91. The spindle-direction upper moving part 17 causes the third cutting blade 50 to move in the first spindle direction D11 to the side of the other end 91b of the cylindrical material 91 which has the side of the inner circumference R1 and side of the outer circumference R2 cut and is rotating.

The depth-direction moving part 16 is configured to be slideable in the depth direction D2 on the spindle-direction upper moving part 17. In the present embodiment, as shown in FIGS. 1 and 2, the depth-direction moving part 16 includes two parallel grooves of inverted trapezoidal shape (trapezoidal shape in which lower base is shorter than upper base) extending in the depth direction D2 to the bottom surface. This groove engages with a projection of the inverted trapezoidal shape provided to an opposing surface of the spindle-direction upper moving part 17.

The depth-direction moving part 16 moves in the depth direction D2 (first depth direction D21, second depth direction D22) relatively to the spindle-direction upper moving part 17, according to an actuator (not shown) and a signal from the rotary drive unit 21. On the other hand, the depth-direction moving part 16 does not move in the vertical direction D3 and spindle direction D1. It should be noted that FIG. 2 shows a state in which the depth-direction moving part 16 has moved on the spindle-direction upper moving part 17 in the second depth direction D22.

The depth-direction moving part 16 causes the first cutting blade 30 to move in the depth direction D2, and contacts the thickness center 91c of the end 91a of the cylindrical material 91 which is rotating by way of the material rotating mechanism 14. Then, the depth-direction moving part 16 reciprocates in the radial direction D4 of the cylindrical material 91 from a state contacting the thickness center 91c, and the spindle-direction upper moving part 17 moves to the side of the other end 91b of the cylindrical material 91. According to this, the first cutting blade 30 cuts the side of the inner circumference R1 of the cylindrical material 91 by forming a semicircular track.

The depth-direction moving part 16 causes the second cutting blade 40 to move in the depth direction D2, and contacts the thickness center 91c of the end 91a of the cylindrical material 91 which is rotating. Then, the depth-direction moving part 16 reciprocates in the radial direction D4 of the cylindrical material 91 from a state contacting the thickness center 91c, and the spindle-direction upper moving part 17 moves to the side of the other end 91b of the cylindrical material 91. According to this, the second cutting blade 40 cuts the side of the outer circumference R2 of the cylindrical material 91 by forming a semicircular track.

The depth-direction moving part 16 causes the third cutting blade 50 to move in the second depth direction D22. The third cutting blade thereby separates the portion 92 of the cylindrical material 91 which was has the side of the inner circumference R1 and side of the outer circumference R2 cut and is rotating, from the remainder 93 by severing.
(First to Third Cutting Blade Holding Parts)

As shown in FIGS. 1 and 2, the first cutting blade holding part includes the first cutting blade holder 31 and first tool post 32, and fixes the first cutting blade 30 to the depth-direction moving part 16. The first cutting blade 30 is held so that the cutting edge 30a faces the second depth direction D22 at a position of the same height as the central axis of the rotating shaft 14a. The first cutting blade holder 31 is fixed to the first tool post 32 while retaining the first cutting blade 30.

The first tool post 32 is engaged with two parallel grooves of dovetail shape provided in the depth-direction moving part 16, on the top of the depth-direction moving part 16. The first tool post 32 can be arranged at any position of the depth-direction moving part 16 so long as being on the grooves of dovetail shape.

The second cutting blade holding part includes the second cutting blade holder 41 and second tool post 42, and fixes the second cutting blade 40 to the depth-direction moving part 16. The second cutting blade 40 is held so that the cutting edge 40a faces the first depth direction D21 at a position of the same height as the central axis of the rotating shaft 14a. The second cutting blade holder 41 is fixed to the second tool post 42 while retaining the second cutting blade 40.

The second tool post 42 is engaged with the aforementioned two parallel grooves of dovetail shape on the top of the depth-direction moving part 16. The second tool post 42 can be arranged at any position of the depth-direction moving part 16 so long as being on the grooves of dovetail shape.

The third cutting blade holding part includes the third cutting blade holder 51 and third tool post 52, and fixes the third cutting blade 50 to the depth-direction moving part 16. The third cutting blade 50 is held so that the cutting edge 50a faces the second depth direction D22 at a position of the same height as the central axis of the rotating shaft 14a. The third cutting blade holder 51 is fixed to the third tool post 52 while retaining the third cutting blade 50.

The third tool post 52 is engaged with the aforementioned two parallel grooves of dovetail shape on the top of the depth-direction moving part 16. The third tool post 52 can be arranged at any position of the depth-direction moving part 16 so long as being on the grooves of dovetail shape.

In other words, as shown in FIG. 2, the first cutting blade 30, second cutting blade 40 and third cutting blade 50 are fixed to the depth-direction moving part 16 simultaneously.
(First to Third Cutting Blades)

As shown in FIG. 3A, the first cutting blade 30 is a cutting blade for inner cutting processes of the cylindrical material 91, and the cutting edge 30a makes an inverted trapezoidal shape. The first cutting blade 30 is held to the first cutting blade holder 31 so as to face the blade edge 30a thereof, for example, in the second depth direction D22, and a ridgeline 30b-30c formed by the proximal end 30b and distal end 30c of the blade edge 30a becomes in parallel with the shaft center of the rotating shaft 14a.

As shown in FIG. 3B, the second cutting blade 40 is a cutting blade for an outer cutting process of the cylindrical material 91, and the cutting edge 40a makes an inverted trapezoidal shape. The second cutting blade 40 is held to the second cutting blade holder 41 so as to face the blade edge 40a thereof, for example, in the first depth direction D21, and a ridgeline 40b-40c formed by the proximal end 40b and distal end 40c of the blade edge 40a becomes in parallel with the shaft center of the rotating shaft 14a.

The third cutting blade 50 is a cutting blade for a separation process of the cylindrical material 91, and the cutting edge 50a is a pointed shape. The cutting edge 50a of the third cutting blade 50 faces the second depth direction D22.

Next, a production method for the ring-shaped part according to an embodiment of the present invention to be carried out by the production apparatus 1 will be described in detail. The production method for the ring-shaped part according to an embodiment of the present invention includes a rotating step, an inner cutting step and an outer cutting step. The rotating step is a step of causing the cylindrical material 91 made of resin to rotate around the axial direction D1 thereof. The inner cutting step is a step of cutting the side of the inner circumference R1 of the cylindrical material 91 while forming a semicircular tack, by causing the first cutting blade 30 to reciprocate in the radial direction D4 of the cylindrical material 91 from a state contacting the thickness center 91c of the end 91a of the cylindrical material 91 which is rotating in the rotating step, and causing to move relatively to a side of the other end 91b of the cylindrical material 91 in the axial direction D1.

The outer cutting step is a step of cutting a side of the outer circumference R2 of the cylindrical material 91 while forming a semicircular track, by causing the second cutting blade 40 to reciprocate in the radial direction D4 of the cylindrical material 91 from a state contacting the thickness center 91c of the end 91a of the cylindrical material 91 which is rotating, and causing to move relatively to the side of the other end 91b of the cylindrical material 91 in the axial direction D1, before, after or simultaneously with the inner cutting step.

The separation step is a step of causing the portion 92 of the cylindrical material 91 which has the side of the inner circumference R1 and the side of the outer circumference R2 cut to separate from the remainder 93 of the cylindrical material 91 by severing, and obtaining the ring-shaped part 94 having a substantially circular cross-section, after the inner cutting step and outer cutting step. When describing in detail, the separation step contacts the third cutting blade 50 on the side of the other end 91b of the portion 92 of the cylindrical material 91 which is rotating and has had the side of the inner circumference R1 and the side of the outer circumference R2 cut, and causes the portion 92 of the cylindrical material 91 to separate from the remainder 93 of the cylindrical material 91 by severing.

In addition, in the inner cutting step, outer cutting step and separation step, machining is performed on the cylindrical material 91 using a machining device 22 having the cutter moving mechanism 15 (16, 17, 18) which simultaneously holds the first cutting blade 30, second cutting blade 40 and third cutting blade 50, and moves in the axial direction D1, and transverse direction (depth direction) D2 which is perpendicular to the axial direction D1. It will be described in further detail below.

(Inner Cutting Step)

As shown in FIG. 5A, the proximal end 30b of the cutting edge 30a of the first cutting blade 30 contacts the thickness center 91c of the end 91a of the cylindrical material 91 which is rotating, by way of the movement in the first spindle direction D11 of the spindle-direction lower moving part 18 and spindle-direction upper moving part 17 and the movement in the depth direction D2 of the depth-direction moving part 16.

Subsequently, as shown in FIG. 5B, the proximal end 30b of the cutting edge 30a of the first cutting blade 30 moves in the inward radial direction D41 of the cylindrical material 91, and moves in the first spindle direction D11, by way of the movement of the above-mentioned cutter moving mechanism 15 (depth-direction moving part 16, spindle-direction upper moving part 17, spindle-direction lower moving part 18) based on cutting data inputted to the rotary drive unit 21. The proximal end 30b of the cutting edge 30a of the first cutting blade 30 thereby cuts the side of the inner circumference R1 of the cylindrical material 91 into 50% of a semicircular arc, i.e. ¼ arc shape, while forming a semicircular track.

Subsequently, as shown in FIG. 5C, the distal end 30c of the cutting edge 30a of the first cutting blade 30 moves in the outward radial direction D42 of the cylindrical material 91, and moves in the first spindle direction D11, by way of the movement of the above-mentioned cutter moving mechanism 15 (depth-direction moving part 16, spindle-direction upper moving part 17, spindle-direction lower moving part 18). The distal end 30c of the cutting edge 30a of the first cutting blade 30 thereby cuts a range corresponding to the remaining 50% of the semicircle on the side of the inner circumference R1 of the cylindrical material 91 into about ¼ arc shape, while forming a semicircular track. The distal end 30c of the cutting edge 30a does not move so far as the thickness center 91c of the cylindrical material 91.

(Outer Cutting Step)

Subsequently, the first cutting blade 30 is retracted from the cylindrical material 91, by way of the movement of the above-mentioned cutter moving mechanism 15 (depth-direction moving part 16, spindle-direction upper moving part 17, spindle-direction lower moving part 18). Then, as shown in FIG. 6A, the proximal end 40b of the cutting edge 40a of the second cutting blade 40 contacts the thickness center 91c of the end 91a of the cylindrical material 91 which is rotating, by way of the above-mentioned cutter moving mechanism 15 (depth-direction moving part 16, spindle-direction upper moving part 17, spindle-direction lower moving part 18).

Subsequently, as shown in FIG. 6B, the proximal end 40b of the cutting edge 40a of the second cutting blade 40 moves in the outward radial direction D42 of the cylindrical material 91, and moves in the first spindle direction D11, by way of movement of the above-mentioned cutter moving mechanism 15 (depth-direction moving part 16, spindle-direction upper moving part 17, spindle-direction lower moving part 18), based on the cutting data inputted to the rotary drive unit 21. The proximal end 40b of the cutting edge 40a of the second cutting blade 40 thereby cuts the side of the outer circumference R2 of the cylindrical material 91 into 50% of a semicircular arc, i.e. ¼ arc shape, while forming a semicircular track.

Subsequently, as shown in FIG. 6C, the distal end 40c of the cutting edge 40a of the second cutting blade 40 moves in the inward radial direction D41 of the cylindrical material 91, and moves in the first spindle direction D11, by way of movement of the above-mentioned cutter moving mechanism 15 (depth-direction moving part 16, spindle-direction upper moving part 17, spindle-direction lower moving part 18). The distal end 40c of the cutting edge 40a of the second cutting blade 40 thereby cuts a range corresponding to the remaining 50% of the semicircle on the side of the outer circumference R2 of the cylindrical material 91 into about ¼ arc shape. The distal end 40c of the cutting edge 40a does not move so far as the thickness center 91c of the cylindrical material 91.

As shown in FIG. 6C, at the completion time of the inner cutting step and outer cutting step, the portion 92 of the cylindrical material 91 which has the side of inner circumference R1 and the side of the outer circumference R2 cut, and the remainder 93 of the cylindrical material 91 are still linked and integrated.

(Separation Step)

Subsequently, the second cutting blade 40 retracts from the cylindrical material 91, by way of the movement of the above-mentioned cutter moving mechanism 15 (depth-direction moving part 16, spindle-direction upper moving part 17, spindle-direction lower moving part 18). Then, as shown in FIG. 7A, the cutting edge 50a of the third cutting blade 50 is arranged at a position on an extended line in the depth direction D2, relative to the other end 92b of the portion 92 of the cylindrical material 91 which has the side of the inner circumference R1 and the side of the outer circumference R2 cut and is rotating, by way of the movement of the above-mentioned cutter moving mechanism 15 (depth-direction moving part 16, spindle-direction upper moving part 17, spindle-direction lower moving part 18).

Subsequently, as shown in FIG. 7B, by way of the movement of the depth-direction moving part 16, the cutting edge 50a of the third cutting blade 50 moves in the second depth direction D22 (outward radial direction D42), and contacts the side of the other end 92b of the portion 92 of the cylindrical material 91. Then, by way of further movement of the depth-direction moving part 16, the cutting edge 50a of the third cutting blade 50 causes the portion 92 of the cylindrical material 91 to separate from the remainder 93 of the cylindrical material 91 by severing. According to this, the ring-shaped part 94 having a substantially circular cross-section shown in FIGS. 4A and 4B is obtained.

(Effects of Embodiment)

According to the production method for ring-shaped parts of the present embodiment, the follow effects are exerted, for example. The production method for ring-shaped parts of the present embodiment includes: a rotating step of rotating a cylindrical material 91 made of resin around an axial direction D1 thereof; an inner cutting step of cutting an inner circumferential R1 side of the cylindrical material 91 while forming a semicircular track, by causing a first cutting blade 30 to reciprocate in a radial direction D4 of the cylindrical material 91 from a state contacting a thickness center 91c of one end 91a of the cylindrical material 91 which is rotating in the rotating step, and causing to move relatively to a side of an other end 91b of the cylindrical material 91 in an axial direction D1; an outer cutting step of, before, after or simultaneously with the inner cutting step, cutting an outer circumferential R2 side of the cylindrical material 91 while forming a semicircular track, by causing the second cutting blade 40 to reciprocate in the radial direction D4 of the cylindrical material 91 from a state contacting the thickness center 91c of the one end 91a of the cylindrical material 91 which is rotating, and causing to move relatively to a side of the other end 91b of the cylindrical material 91 in the axial direction D1; and a separation step of, after the inner cutting step and outer cutting step, causing a portion 92 of the cylindrical material 91 which has had the inner circumferential R1 side and the outer circumferential R2 side cut to separate from a remainder 93 of the cylindrical material 91 by severing, and obtaining a ring-shaped part 94 having a substantially circular cross-section.

For this reason, according to the production method and production apparatus 1 for ring-shaped parts of the present embodiment, an expensive die is unnecessary compared to the production method for ring-shaped parts by way of metallic molding. In addition, since a schedule required in production of dies also is unnecessary, it is possible to perform small-volume production in great varieties when required.

In the production method for ring-shaped parts of the present embodiment, the separation step contacts the third cutting blade 50 to a side of the other end 91b of the portion 92 of the cylindrical material 91 which is rotating and has had the side of the inner circumference R1 and the side of the outer circumference R2 cut, and separates the portion 92 of the cylindrical material 91 from the remainder 93 of the cylindrical material 91 by severing. For this reason, due to using the third cutting blade 50 as a dedicated cutting blade for separating the portion 92 of the cylindrical material 91 by severing, implementation of the separation step is easy compared to separating the portion 92 of the cylindrical material by severing using the first cutting blade 30 and second cutting blade 40. In addition, the finish on the end face of the ring-shaped part 94 becomes clean.

In the production method for ring-shaped parts of the present embodiment, in the inner cutting step, outer cutting step and separation step, machining is performed on the cylindrical material 91 using the machining device 22 having the cutter moving mechanism 15 (16, 17, 18) which simultaneously holds the first cutting blade 30, second cutting blade 40 and third cutting blade 50, and moves in the axial direction D1 and the transverse direction (depth direction) D2, which is perpendicular to the axial direction D1. For this reason, upon process alterations to the inner cutting step, outer cutting step and separation step, replacement of the cutting blades is unnecessary. Therefore, it is possible to reduce the time lag between steps, and thus the ring-shaped part 94 made of resin can be produced more efficiently.

(Modified Example)

An embodiment of the present invention has been explained above. However, the present invention is not to be limited to the aforementioned embodiment, and can be implemented in various forms. For example, the outer cutting step can be performed before the inner cutting step, and the outer cutting step can be performed simultaneously with the inner cutting step. The cylindrical material may be made to move in the axial direction without moving the cutting blade in the axial direction, or both thereof may be made to move in the axial direction with each other.

In addition, the third cutting blade 50 may be omitted, and the portion 92 of the cylindrical material 91 which is rotating and has had the side of the inner circumference R1 and the side of the outer circumference R2 cut may be made to separate from the remainder 93 of the cylindrical material 91 by severing using the first cutting blade 30 or second cutting blade 40 in the separation step.

The direction in which at least any one of the first cutting blade 30, second cutting blade 40 and third cutting blade 50 extends is not limited to the transverse direction and depth direction D2, and may be the vertical direction D3, for example. In this case, at least any one of the first cutting blade 30, second cutting blade 40 and third cutting blade 50 moves in the vertical direction.

In the production apparatus 1 for ring-shaped parts, instead of simultaneously holding the first cutting blade 30, second cutting blade 40 and third cutting blade 50, it is possible to sequentially exchange the cutting blades using an automatic tool exchanging device having a turret and the like, or sequentially remove and exchange the cutting blade in each occurrence of the inner cutting step, outer cutting step and separation step.

EXPLANATION OF REFERENCE NUMERALS 1 production apparatus
14 material rotating mechanism
11 first cutting blade moving mechanism
12 second cutting blade moving mechanism
13 third cutting blade moving mechanism
15 cutter moving mechanism
22 machining device
30 first cutting blade
40 second cutting blade
50 third cutting blade
91 cylindrical material
91a one end
91b other end
91c thickness center
92 portion
93 remainder
94 ring-shaped part
D1 axial direction, spindle direction
D2 transverse direction, depth direction
D3 vertical direction
D4 radial direction
R1 inner circumference
R2 outer circumference

The invention claimed is:

1. A production method for a ring-shaped part, the method comprising:
  a rotating step of rotating a cylindrical material made of resin around an axial direction thereof;
  an inner cutting step of cutting an inner circumferential side of the cylindrical material while forming a semicircular track, by causing a first cutting blade to reciprocate in a radial direction of the cylindrical material from a state contacting a thickness center of one end of the cylindrical material which is rotating in the rotating step, and causing to move relatively to a side of an other end of the cylindrical material in an axial direction;
  an outer cutting step of, before, after or simultaneously with the inner cutting step, cutting an outer circumferential side of the cylindrical material while forming a semicircular track, by causing the second cutting blade to reciprocate in the radial direction of the cylindrical material from a state contacting the thickness center of the one end of the cylindrical material which is rotating, and causing to move relatively to a side of the other end of the cylindrical material in the axial direction; and a separation step of, after the inner cutting step and outer cutting step, causing a portion of the cylindrical material which has had the inner circumferential side and the outer circumferential side cut to separate from a remainder of the cylindrical material by severing, and obtaining a ring-shaped part having a substantially circular cross-section.

2. The production method for a ring-shaped part according to claim 1, wherein the separation step contacts the third cutting blade to the other end of the portion of the cylindrical material which is rotating and has had the inner circumferential side and the outer circumferential side cut, and causes the portion of the cylindrical material to separate from the remainder of the cylindrical material by severing.

3. The production method for a ring-shaped part according to claim 2, wherein, in the inner cutting step, the outer cutting step and the separation step, machining is performed on the cylindrical material using a machining device having a cutter moving mechanism which simultaneously holds the first cutting blade, the second cutting blade and the third cutting blade, and moves in an axial direction and a transverse direction perpendicular to the axial direction.

4. The production method for a ring-shaped part according to claim 1, wherein the resin is a fluororesin.

5. A production apparatus for a ring-shaped part, the apparatus comprising:

a material rotating mechanism which causes a cylindrical material made of resin to rotate around an axial direction thereof;

a first cutting blade moving mechanism which causes a first cutting blade to move, and cuts an inner circumferential side of the cylindrical material while forming a semicircular track, by causing the first cutting blade to reciprocate in a radial direction of the cylindrical material from a state contacting a thickness center of one end of the cylindrical material which is rotating by way of the material rotating mechanism, and causing to move to a side of an other end of the cylindrical material in an axial direction;

a second cutting blade moving mechanism which causes a second cutting blade to move, and cuts an outer circumferential side of the cylindrical material while forming a semicircular track, by causing the second cutting blade to reciprocate in a radial direction of the cylindrical material from a state contacting the thickness center of the one end of the cylindrical material which is rotating, and causing to move to a side of the other end of the cylindrical material in the axial direction; and a third cutting blade moving mechanism which causes a third cutting blade to move, and contacts the third cutting blade to a side of the other end of a portion of the cylindrical material which has had an inner circumferential side and an outer circumferential side cut and is rotating, and separates portion of the cylindrical material from a remainder of the cylindrical material by severing to obtain a ring-shaped part having a substantially circular cross-section.

* * * * *